United States Patent [19]

Noguchi et al.

[11] 4,258,669
[45] Mar. 31, 1981

[54] TWO-STROKE CYCLE GASOLINE ENGINE

[75] Inventors: Masaaki Noguchi, Nagoya; Yukiyasu Tanaka; Isao Igarashi, both of Okazaki, all of Japan

[73] Assignee: Toyota Jidosha Kogyo Kabushiki Kaisha, Toyota, Japan

[21] Appl. No.: 17,965

[22] Filed: Mar. 6, 1979

[30] Foreign Application Priority Data

Jul. 5, 1978 [JP] Japan .................................. 53-81561

[51] Int. Cl.³ .................... F02B 25/08; F02B 33/04; F02D 39/04
[52] U.S. Cl. .......................... 123/51 BA; 123/51 BD; 123/65 A; 123/65 PD; 123/70 R; 123/23 AF; 123/23 S
[58] Field of Search ............. 123/51 R, 51 B, 51 BA, 123/51 BD, 65 A, 65 P, 65 PD, 70 R, 73 R, 73 A, 73 AF, 73 AE, 73 S, 73 PP, 73 SP, 336, 442, 457

[56] References Cited

U.S. PATENT DOCUMENTS

| 1,978,816 | 10/1934 | Pollister | 123/65 P |
| 3,363,611 | 1/1968 | Seggern et al. | 123/73 R |
| 3,550,568 | 12/1970 | Peterson | 123/51 BD |
| 3,685,503 | 8/1972 | Jackson | 123/457 |
| 4,090,479 | 5/1978 | Kaye | 123/51 B |

Primary Examiner—Craig R. Feinberg
Attorney, Agent, or Firm—Finnegan, Henderson, Farabow, Garrett & Dunner

[57] ABSTRACT

A two-stroke cycle gasoline engine including at least one two-stroke cycle power cylinder - piston assembly incorporating uniflow scavenging and two horizontally opposed pistons, and a scavenging structure which gives zero or a relatively weak swirl to the scavenging mixture ejected into the power cylinder so as to effect stratified scavenging of exhaust gases when the engine is operating at relatively low load and which gives a relatively strong swirl to the scavenging mixture ejected into the power cylinder so as to cause high turbulence in the mixture when the engine is operating at relatively high load.

6 Claims, 10 Drawing Figures

TWO-STROKE CYCLE GASOLINE ENGINE

BACKGROUND OF THE INVENTION

The present invention relates to a two-stroke cycle gasoline engine, and, more particularly, to a two-stroke cycle gasoline engine adapted for use with automobiles.

A two-stroke cycle engine has theoretically the advantage that an engine of a certain size can generate a greater power than a four-stroke cycle engine of a bigger size because the two-stroke cycle engine has twice as many work cycles per revolution as the four-stroke cycle engine. In fact, however, a conventional two-stroke cycle gasoline engine employing a carburetor has drawbacks, such as: that it has high fuel consumption as compared with a four stroke-cycle engine due to the loss of air/fuel mixture caused by the direct escape, i.e. blow-out, of scavenging mixture to the exhaust manifold during scavenging; that it cannot generate such a high power as expected from the fact that it has twice as many work strokes as the corresponding four-stroke cycle engine, due to the fact that the scavenging is still insufficient; and that it is subject to unbalanced combustion of fuel in the cylinders, due to the large amount of exhaust gases remaining in the power cylinder because of incomplete scavenging. This unbalanced combustion of fuel due to incomplete scavenging is particularly liable to occur when an engine which is designed to provide a high power output is operated in the idling condition or at a relatively low partial load, as in often the case with automobile engines. If such unbalanced combustion occurs, the engine generates a high level of vibration and noise, and its fuel consumption further deteriorates, together with increase of HC in the exhaust gases.

Methods of scavenging in two-stroke cycle engines are conventionally known as cross scavenging, loop scavenging, and uniflow scavenging. In this connection, if the amount of scavenging mixture is increased so as to improve scavenging engaging efficiency, uniflow scavenging is considered to be most desirable in order to obtain the highest scavenging efficiency without causing direct escape of the scavenging mixture to the exhaust manifold. In view of this, and in view of the aforementioned drawbacks, the actual application of two-stroke cycle gasoline engines has been conventionally limited to the field of small-size engines in which simplicity of structure and low manufacturing cost are essential conditions. Therefore, conventional two-stroke cycle gasoline engines presently used generally employ crankcase compression for scavenging. However, scavenging by crankcase compression cannot deliver a sufficient amount of scavenging mixture, thereby causing incomplete scavenging which leads to a relatively low volumetric efficiency. In view of the fact that such a low volumetric efficiency is the principal cause of the poor output power of conventional two-stroke cycle gasoline engines, in co-pending U.S. Pat. application Ser. No. 917,244 we have proposed a two-stroke cycle gasoline engine particularly suitable for use as an automobile engine, which comprises at least one two-stroke cycle power cylinder-piston assembly incorporating uniflow scavenging and two horizontally opposed pistons, and at least one scavenging pump cylinder-piston assembly of the reciprocating type, with or without incorporating crankcase compression, wherein the total stroke volume of the scavenging pump means is 1.35 to 1.85 times as large as that of the power cylinder-piston assembly, so that the volumetric efficiency is substantially increased so as to generate high power output when compared with conventional two-stroke cycle gasoline engines. Furthermore, in view of the fact that even when a separate pump cylinder-piston assembly is employed, as proposed in the abovementioned co-pending application, if the conventional crankcase compression is also incorporated, the operational phase relation between the power cylinder-piston assembly and the scavenging pump means is substantially restricted, we proposed in U.S. Pat. No. 4,185,596 not to utilize crankcase compression. The patent is directed to a two-stroke cycle gasoline engine which comprises at least one two-stroke cycle power cylinder-piston assembly incorporating uniflow scavenging and two horizontally opposed pistons, and at least one scavenging pump cylinder-piston assembly of the reciprocating type and driven by said power cylinder-piston assembly in synchronization therewith with a phase difference. The total stroke volume of the pump cylinder-piston assembly is between 1.15 and 1.65 times as large as that of said power cylinder-piston assembly, and the phase difference between the power and the pump cylinder-piston assemblies is so determined that the top dead center of a pump cylinder-piston assembly is, as viewed in the crank angle diagram, in a range between 15° in advance of and 15° behind the midpoint between the bottom dead center and the scavenging port closing phase point of the power cylinder-piston assembly to which it supplies scavenging mixture. The structure substantially improves the engine's scavenging efficiency when compared with conventional two-stroke cycle gasoline engines so that the engine can generate high output power and is suitable for use as an automobile engine.

In either of the abovementioned two-stroke cycle gasoline engines, in order to improve scavenging efficiency, the amount of scavenging mixture is increased by employing an additional or separate pump when compared with the conventional scavenging dependent only upon crankcase compression. In this connection, it is noted that a two-stroke cycle power cylinder-piston assembly incorporating uniflow scavenging and two horizontally opposed pistons generally provides a relatively long distance between its scavenging ports and its exhaust ports when compared with two-stroke cycle engines incorporating other types of scavenging, and that particularly when such an engine further incorporates an additional or separate scavenging pump means so as to increase the amount of scavenging mixture when compared with the conventional two-stroke cycle engines dependent upon only crankcase compression, as in the aforementioned two-stroke cycle engines, the engine can be constructed as a long-stroke engine having a further increased distance between its scavenging ports and its exhaust ports. A feature in which uniflow scavenging is different from other types of scavenging is that, if necessary, it is able to perform scavenging without causing any substantial turbulence in the power cylinder. In other words, if it is so designed that scavenging mixture is introduced into a power cylinder through its scavenging ports with as small turbulence, such as swirl, as possible being given to the scavenging mixture, the scavenging mixture travels in the power cylinder in a stratified manner so that the scavenging mixture and the exhaust gases are transferred from the scavenging ports to the exhaust ports while maintaining stratification between themselves. If such stratified scavenging is performed, and if in this case the scavenging mixture is a mixture of gasoline and air, this mixture is decomposed by heating applied by the exhaust gases in the bordering area between the mixture and the exhaust gases so as to generate chemically activated radicals such as C2, CH, CHO, OOH, H, etc.. In order that such a decomposition of fuel-air mixture is effectively performed, not only a mass of exhaust gases having a high temperature and a high heat capacity is required, but also it is necessary that fuel-air mixture contacts such the mass of exhaust gases at their bordering area without substantially disturbing the mass of exhaust gases, because if the fuel-air mixture and the exhaust gases substantially mix with each other so that the mass of exhaust gases is disturbed, the exhaust gases are cooled somewhat and fall below the high temperature which is required for effecting the decomposition of fuel-air mixture. In this connection, in uniflow scavenging it is possible to perform scavenging without causing great mixing between scavenging mixture and exhaust gases, so that they are maintained in a stratified condition. Particularly in an engine which incorporates uniflow scavenging and two horizontally opposed pistons, the distance between the scavenging ports and the exhaust ports is made particularly long, and the time during which scavenging mixture and exhaust gases contact each other in a stratified condition so that the mixture is decomposed so as to generate activated radicals is longer, thereby increasing the amount of radicals generated. Therefore, in connection with the concept of employing a two-stroke cycle power cylinder-piston assembly incorporating uniflow scavenging and two horizontally opposed pistons as a power cylinder of a two-stroke cycle gasoline engine, it is contemplated to give as little turbulence as possible to the scavenging mixture introduced into the power cylinder so as to perform scavenging of the power cylinder while maintaining as good a stratified condition as possible between the scavenging mixture and exhaust gases so that the mixture is decomposed by the high temperature and heat of the exhaust gases so as to generate a large amount of activated radicals and so as to improve combustion of fuel in the power cylinder.

However, in connection with the fact that the present invention intends to provide a two-stroke cycle gasoline engine particularly suitable for use as an automobile engine, it is noted that the abovementioned generation of radicals due to stratified scavenging is effective for improving combustion of fuel when the engine is idling or operating at partial load, thereby effectively solving problems such as high vibration and noise, poor fuel consumption, increase of HC in exhaust gases, etc., due to unbalanced combustion in idling or low load operation. On the other hand when the engine is operating at high load the amount of scavenging mixture as well as the rotational speed of the engine increases so that the scavenging speed must be correspondingly increased to such an extent that the decomposition of mixture by exhaust gases is no longer effectively performed. In this operating condition, in order to increase the combustion speed of mixture it is more effective to give turbulence positively to the mixture so that fuel is well mixed with combustion air. As a result of experiments, we have found that in low load operation, at delivery ratio under about 0.4, decomposition of mixture by stratified scavenging is effective for improving combustion of fuel so as to improve fuel consumption by 10-20% and to reduce concentration of HC in exhaust gases to about ½ when compared with conventional two-stroke cycle gasoline engines. On the other hand, in medium to high load operation, at delivery ratio at or above approximately 0.4, it is more effective for improving combustion of mixture to give a proper swirl to the flow of mixture introduced into the power cylinder through the scavenging ports so as to generate turbulence in the power cylinder so that fuel-air mixture is strongly agitated. In this connection, in a two-stroke cycle power cylinder-piston assembly incorporating uniflow scavenging and two horizontally opposed pistons wherein a long distance is available between the scavenging and the exhaust ports, if a good stratified condition is maintained during scavenging in low load operation at delivery ratio between approximately 0.4, decomposition of fuel-air mixture can proceed so far as to cause automatic ignition by compression. On the other hand, when a proper swirl is given to the flow of scavenging mixture, particularly in a two-stroke cycle power cylinder-piston assembly incorporating uniflow scavenging and two horizontally opposed pistons, in medium to high load operation at delivery ratio at or above approximately 0.4, the swirl scavenging mixture is well maintained during the compression stroke and contributes to accomplishing quick and desirable combustion of fuel after ignition.

The term "delivery ratio" refers to the ratio of the weight of the total scavenging air or mixture used in one stroke scavenging to the weight of a volume of scavenging air or mixture at atmospheric pressure and temperature which corresponds to the stroke volume of an engine.

SUMMARY OF THE INVENTION

Therefore, the object of the present invention is, depending upon the abovementioned discovery with regard to improvement of fuel combustion in a two-stroke cycle gasoline engine which employs a two-stroke cycle power cylinder-piston assembly incorporating uniflow scavenging and two horizontally opposed pistons, to provide an improved two-stroke cycle gasoline engine which operates in a wide range of operational conditions, as in automobiles, with desirable conditions of fuel combustion over the entire operational region.

According to the present invention, the abovementioned object is accomplished by a two-stroke cycle gasoline engine comprising at least one two-stroke cycle power cylinder-piston assembly having scavenging ports and two horizontally opposed pistons and incorporating uniflow scavenging, and a scavenging structure which gives swirl of at least two different intensities (including zero swirl) to the scavenging mixture ejected from said scavenging ports, wherein substantially the swirl given to the scavenging mixture is zero or relatively weak when the delivery ratio of the engine is below a predetermined value and the swirl given to the scavenging mixture is relatively strong when the delivery ratio of the engine is at or above the predetermined value. In this case it is generally desirable that the abovementioned predetermined value with regard to delivery ratio should be about 0.4.

As a scavenging structure which gives swirl of different intensities to the scavenging mixture in accordance with changes of the delivery ratio of the engine various structures are employable. However, one of the most simple structures will be such a structure which comprises two groups of scavenging ports, wherein a first group of scavenging ports are adapted to give a relatively strong swirl to the scavenging mixture ejected therefrom while a second group of scavenging ports are adapted to give zero or a relatively weak swirl to the scavenging mixture ejected therefrom, and wherein ejection of scavenging mixture from said first group of scavenging ports is stopped in operation at delivery ratio below a predetermined value so that scavenging mixture is ejected only from said second group of scavenging ports, while, on the other hand, when the delivery ratio of the engine is at or above the predetermined value, scavenging mixture is ejected from both said first and second groups of scavenging ports. In this case, it is desirable that said first group of scavenging ports should be positioned closer to the central position of the power cylinder than said second group of scavenging ports, so that said first group of scavenging ports are opened in advance of said second group of scavenging ports, whereby a stronger swirl of scavenging mixture is generated in the power cylinder. When such a scavenging structure is employed, if first and second scavenging plenums are separately provided for said first and second groups of scavenging ports with an ON/OFF valve incorporated in a passage leading to said first scavenging plenum, the intensity of swirl given to the scavenging mixture can be readily controlled by ON and OFF operation of the control valve in accordance with changes of delivery ratio.

In this connection, it is to be noted that, since a two-stroke cycle gasoline engine which employs a two-stroke cycle power cylinder-piston assembly incorporating uniflow scavenging and two horizontally opposed pistons accomplishes desirable combustion of fuel-air mixture over a wide load range as mentioned above, it is desirable that, in order to obtain this advantage to the maximum, compression of scavenging mixture should not only be dependent upon the crankcase compression, but also should be performed by a supplementary or an independent pump cylinder-piston assembly, as in the two-stroke cycle gasoline engines proposed in the aforementioned prior applications, so that the engine is operated at high scavenging efficiency. However, it is also to be noted that the technical concept of the present invention is also applicable to a two-stroke cycle gasoline engine of the conventional type which employs a two-stroke cycle power cylinder-piston assembly incorporating uniflow scavenging and two horizontally opposed pistons and which is dependent upon only crankcase compression.

BRIEF DESCRIPTION OF THE DRAWING

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENT

Referring to FIGS. 1-4, showing the first embodiment of the present invention, the two-stroke cycle gasoline engine herein shown comprises a cylinder block 10, the overall shape of which is like a relatively flat block rectangular in a plan view and is adapted to be installed substantially with the two largest of its six faces arranged horizontally. In the cylinder block there are provided a pair of crankshafts 12 and 14 which are arranged along opposite edges of the cylinder block and are rotatably supported by bearings 10a-10c and 10d-10f, respectively. In this embodiment, for example, the crankshaft 12 may be connected to auxiliaries of the engine while on the other side the crankshaft 14 may serve as the power output shaft of the engine. In the cylinder block 10 there are incorporated a power cylinder-piston assembly 100 and an independent reciprocating type scavenging pump 300, which is in this embodiment a pump cylinder-piston assembly having horizontally opposed pistons. Further, in this embodiment, the power cylinder-piston assembly 100 does not incorporate crankcase compression, and therefore scavenging mixture is compressed only by the independent scavenging pump 300.

Figure 1:
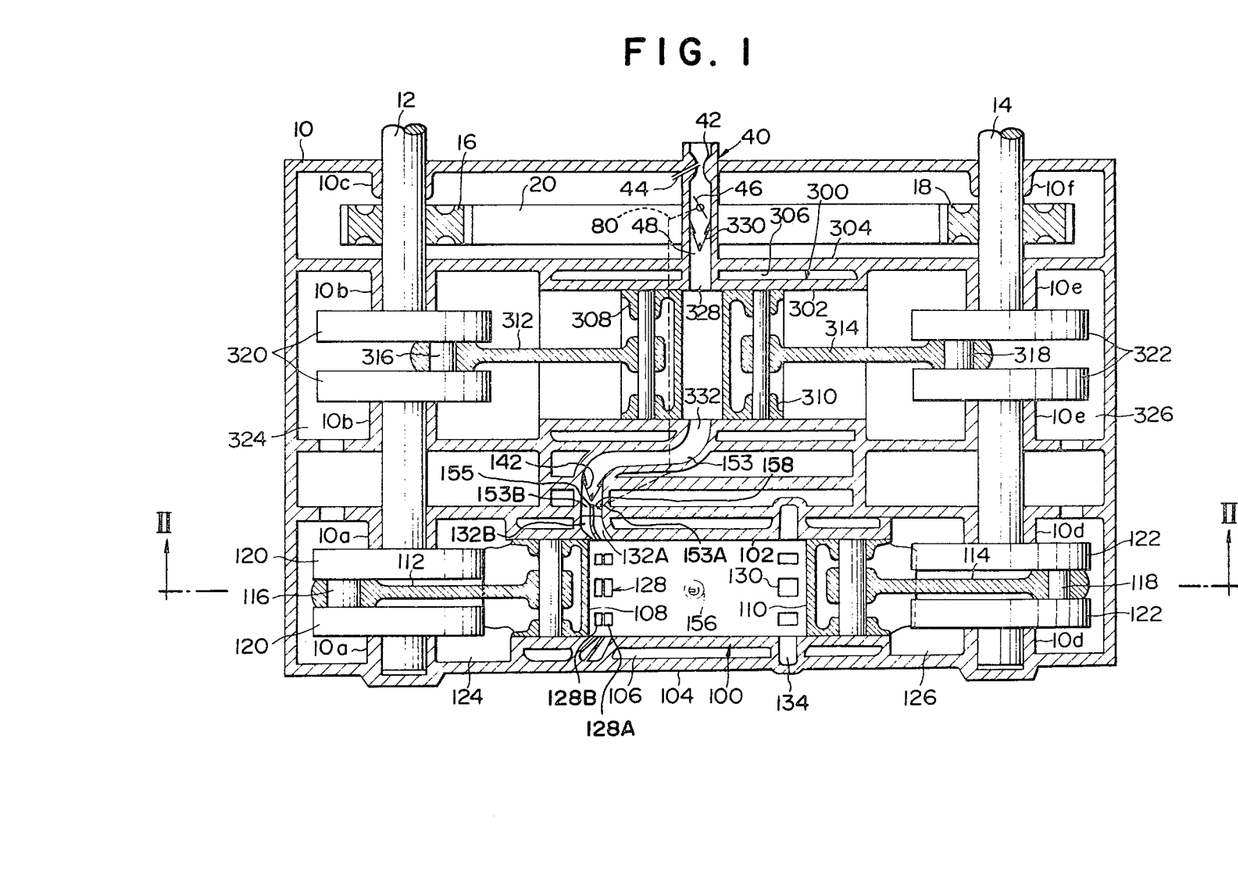
FIG. 1 is a diagrammatical plan sectional view showing a first embodiment of the two-stroke cycle gasoline engine of the present invention.
Figure 2:
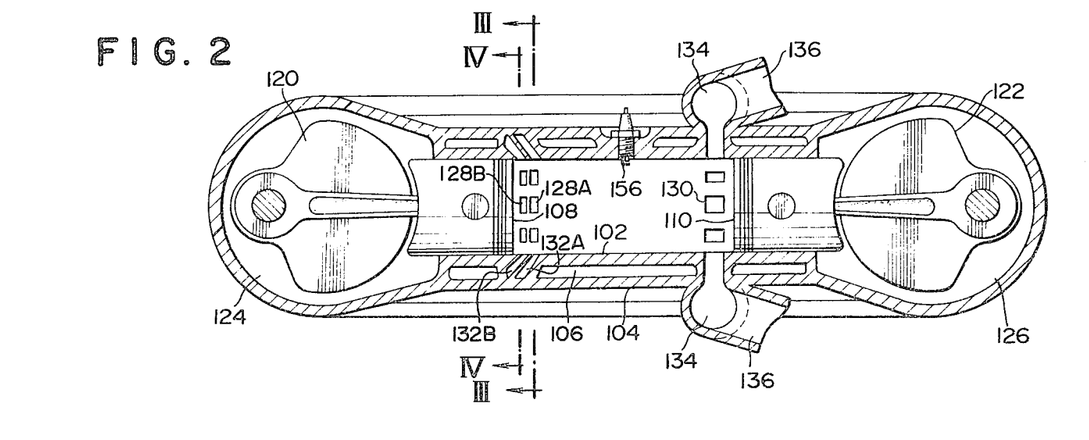
FIG. 2 is a sectional view along line II—II in FIG. 1.

First, the power cylinder-piston assembly 100 will be described. The assembly includes a power cylinder 102 supported by the cylinder block 10. The power cylinder is surrounded by a cooling jacket 106 defined by a jacket wall 104. In the cylinder 102 are arranged two power pistons 108 and 110, one being located on the scavenging side or the left side in the figure while the other is located on the exhaust side or the right side in the figure, respectively. The pistons 108 and 110 are individually connected with connecting rods 112 and 114, which in turn are individually connected with crankpins 116 and 118. The crankpins 116 and 118 are individually supported by crank arms 120 and 122. The two crank mechanisms each including the crank arm and the crank pin are individually housed in crankcases 124 and 126. Since in this case no crankcase compression is involved, the crankcases may have any clearance volume.

Figure 3:
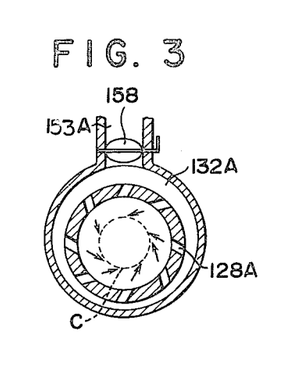
FIGS. 3 and 4 are sectional views along lines III—III and IV—IV in FIG. 2.
Figure 4:
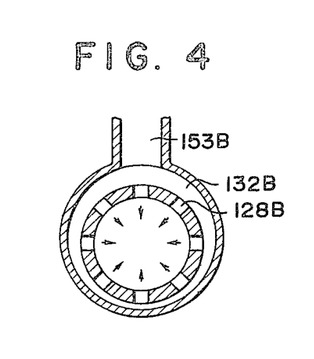

The cylinder 102 has a plurality of scavenging ports 128 on its scavenging side and a plurality of exhaust ports 130 on its exhaust side. The scavenging ports 128 are divided into two groups: a first group of scavenging ports 128A and a second group of scavenging ports 128B arranged side by side in the longitudinal direction of the power cylinder. As shown in FIG. 3, the scavenging ports 128A open along axes tangential to a phantom cylinder C coaxial with the cylinder 102. On the other hand, as shown in FIG. 4, the scavenging ports 128B open towards the central axis of the power cylinder 102. Furthermore, the scavenging ports 128A and 128B are inclined toward the exhaust side so that the flows of scavenging mixture discharged from these scavenging ports have a velocity component towards the exhaust ports 130. Thus, the scavenging mixture discharged from the scavenging ports 128A is formed into a swirl flow which proceeds helically in the cylinder 102 towards the exhaust ports, while on the other hand the flows of scavenging mixture discharged from the scavenging ports 128B collide with each other at the center of the cylinder 102 and then proceed along the central axis of the cylinder toward its exhaust side. The first and second groups of scavenging ports 128A and 128B are individually connected with first and second scavenging plenums 132A and 132B arranged side by side. The scavenging plenums 132A and 132B are supplied with scavenging mixture from the pump 300 by way of a passage 153, as explained in detail hereinunder. In this case, the passage 153 is divided into passages 153A and 153B by a partition 155 at its downstream portion, and in the passage 153A is provided a control valve 158 which opens or closes the passage. The exhaust ports 130 are connected with an exhaust plenum 134 which is connected with exhaust pipes 136. At a longitudinal central portion of the cylinder 102 is provided a spark plug 156.

Next, the pump 300 will be described. The pump includes a pump cylinder 302 supported by the cylinder block 10. The pump cylinder 302 is surrounded by a cooling jacket 306 defined by a jacket wall 304. This cooling jacket serves to remove the compression heat of mixture generated in the pump 300 so as to increase the volumetric efficiency of the pump, while further, when the engine is operated in cold weather, it serves to warm the pump cylinder so as to expedite atomization of the gasoline. For this purpose, the cooling jacket 306 is connected with the cooling jacket 106 of the power cylinder by a passage means not shown in the figure. In the pump cylinder 302 are provided a pair of pump pistons 308 and 310 as opposed to each other. The pistons 308 and 310 are individually connected with connecting rods 312 and 314 which in turn are individually connected with crank pins 316 and 318. The crank pins 316 and 318 are individually supported by crank arms 320 and 322. The crank mechanisms, composed of the connecting rods, crank pins, and crank arms, are individually housed in crankcases 324 and 326. These crankcases of the pump assembly are connected with the crankcases 124 and 126 so as to balance the pulsations of the crankcase pressure caused by the pistons 308 and 310. Furthermore, the crankcases are connected with the internal space of an air cleaner (not shown in the figure) by a positive crankcase ventilation valve (also not shown in the figure).

40 designates a carburetor which includes a venturi portion 42, a main fuel nozzle 44 which opens to the throat portion of the venturi portion, and a throttle valve 46, and takes in air from its air inlet port located upward in the figure and produces fuel-air mixture in the usual manner. The mixture outlet port of the carburetor 40 is connected with an inlet port 328 of the pump 300 by way of a passage 48. In the passage 48 or in the port 328 is provided a reed valve 330 which allows fluid to flow only toward the pump chamber. The outlet port 332 of the pump 300 is connected with the scavenging plenums 132A and 132B of the power assembly 100 by way of the passage 153. In this passage and in proximity to the scavenging plenums 132A and 132B is provided a reed valve 142 which prevents blowback of combustion gases from the cylinder 102. If there is no danger of such blowback, this reed valve may be omitted. Furthermore, the reed valve 142 serves to interrupt the flow of mixture from the scavenging plenums to the pump cylinder when high vacuum is generated in the pump 300 due to its suction stroke after the pump pistons have passed their top dead center (TDC). However, when the two-stroke cycle gasoline engine of the present invention which incorporates uniflow scavenging and two horizontally opposed pistons is constructed as in the present embodiment so as to supply scavenging mixture by an independent scavenging pump, it is desirable that the TDC of the pump 300 should be positioned substantially behind the BDC of the power assembly 100, in accordance with the inventive concept proposed in the aforementioned U.S. Pat. No. 4,185,596. In such a case, the period between pump piston TDC and the exhaust port closing phase point is short, and therefore there exists positive pressure around the scavenging ports due to inertia effects even when the pump 300 has entered its suction stroke. Therefore the drawing action of the pump 300 does not substantially affect scavenging of the pump cylinder 102. Therefore, unless the aforementioned blowback of combustion gases should occur, there would exist no reverse flow which would need to be interrupted by the reed valve 142.

Figure 5:
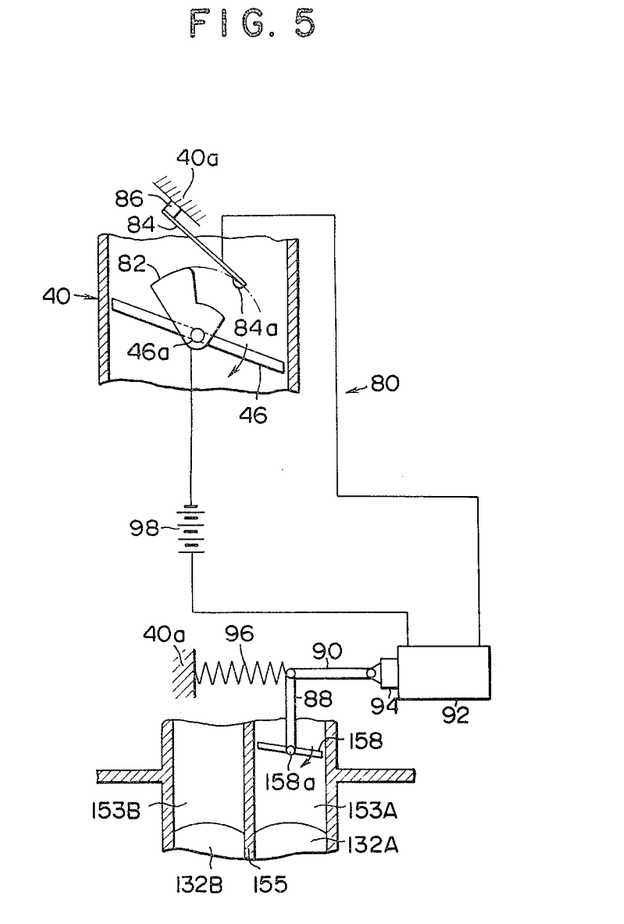
FIG. 5 is a diagrammatical view showing an embodiment of the control system to be incorporated in the two-stroke cycle gasoline engine of the present invention.

The control valve 158 provided in the passage 153A connected with the scavenging plenum 132A is operatively connected with the throttle valve 46 by way of a control system 80 diagrammatically shown by a broken line in FIG. 1. The control valve 158 is operated by the control system 80 in accordance with the opening of the throttle valve 46 so that the control valve opens the passage 153A when the throttle valve 46 is opened relatively widely so as to provide delivery ratio of 0.4 or above while on the other hand it closes the passage 153A when the throttle valve 46 is closed or slightly opened so as to provide delivery ratio of less than 0.4. The control system 800 may be a mechanical control system, an electrical control system, a fluid pressure control system employing manifold vacuum or other fluid pressure, or any of various combinations of these and other control systems. FIG. 5 shows an embodiment of the control system 80 constructed as an electric control system. The throttle shaft 46a of the throttle valve 46 supports a cam 82 mounted thereto, which is adapted to contact a contact point 84a of a contact element 84 formed as a spring plate when the throttle valve 46 is opened to such an amount which provides delivery ratio of or larger than 0.4. The contact element 84 is mounted at one of its ends to the housing 40a of the carburetor by way of an insulating member 86. On the other hand, the control valve 158 has a valve shaft 158a which is connected with an armature 94 of a solenoid 92 by way of link elements 88 and 90, and is adapted to be opened in the direction shown by an arrow so as to open the passage 153A when the solenoid 92 is energized. When the solenoid 92 is not energized, the control valve 152 is returned to its closed position as shown in FIG. 5 by a tension spring 96 so as to close the passage 153A. The solenoid 92 is selectively energized by an electric source 98 such as the battery of an automobile through a switching means composed of the cam 82 and the contact element 84. When the throttle valve 46 is closed or slightly opened so as to provide delivery ratio less than 0.4 so that the cam 82 is out of contact with the contact point 84a of the contact element 84, the solenoid 92 is not energized, and therefore the control valve 158 is held by the tension coil spring 96 at its closed position as shown in FIG. 5, thereby closing the passage 153A. On the other hand, when the throttle valve 46 is opened wide so as to provide delivery ratio of or above 0.4, so that the cam 82 comes into contact with the contact point 84a of the contact element 84, the solenoid 92 is energized, whereby the control valve 158 is turned clockwise in the figure against the action of the tension coil spring 96 so as to open the passage 153A.

The crankshafts 12 and 14 are drivingly connected with each other by sprocket wheels 16 and 18 individually mounted on the crankshafts and an endless chain 20 engaged around these sprocket wheels so as to co-rotate in the same direction at the same rotational speed. The phase relation between the crankshafts 12 and 14 is so determined that the crankpins 116 and 118 related with the power pistons 108 and 110 are shifted from each other by a phase difference of 180°. Depending upon this phase relation between the crankshafts 12 and 14 the crankpins 316 and 318 related to the pump pistons 308 and 310 are also shifted from each other by the same phase difference of 180°.

Figure 6:
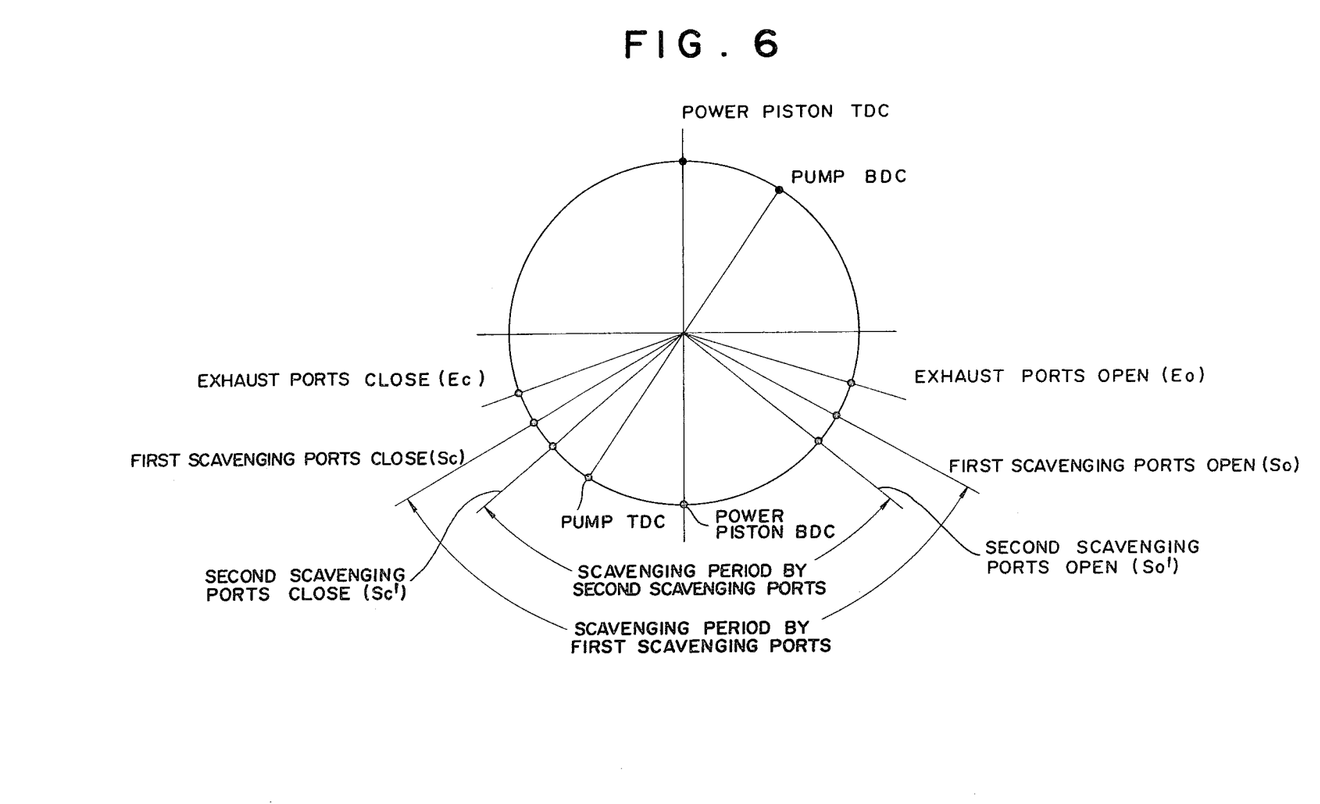
FIG. 6 is a crank angle diagram which explains the operational phase angles of the two-stroke cycle gasoline engine of the present invention.

FIG. 6 is a crank angle diagram of the engine explained above as a first embodiment of the present invention. As seen in the crank angle diagram, when the power pistons proceed from their TDC by an angle slightly larger than 90° as seen in the crank angle diagram, the exhaust ports 130 are opened (exhaust port opening phase point Eo) so as to discharge exhaust gases therethrough. When the pressure of exhaust gases has substantially dropped, the first group of scavenging ports 128A are opened at the first scavenging port opening phase point So, and then, slightly delayed therefrom, at second scavenging port opening phase point So', the second group of scavenging ports 128B are opened. Since the crankpins 116 and 118 are synchronized with each other so as to have a phase difference of 180° therebetween, in FIG. 6 the phase point Eo where the exhaust ports are opened and the phase point Ec where the exhaust ports are closed are positioned symmetrically with respect to the center line which connects TDC and BDC of the power piston, and similarly the phase points So and So' where the first and second groups of scavenging ports are opened and the phase points Sc and Sc' where the first and second groups of scavenging ports are closed are positioned symmetrically with respect to the aforementioned center line, respectively. Furthermore, in this embodiment the operational phase of the pump pistons relative to that of the power pistons, i.e. the phase difference of the crankpin 316 or 318 relative to the crankpin 116 or 118, respectively, is determined so that, as seen in the crank angle diagram, TDC of the pump is retarded relative to BDC of the power piston by about 30°. This phase setting of substantially retarding pump TDC from power piston BDC depends upon the inventive concept of the aforementioned U.S. Pat. No. 4,185,596. However, when the two-stroke gasoline engine in accordance with the present invention is constructed to employ only crankcase compression without incorporating any supplementary or independent scavenging pump, pump TDC naturally coincides with power piston BDC.

In operation of the engine of the abovementioned structure, when the pump pistons 308 and 310 move from their TDC to their BDC so as to perform a suction stroke, fuel-air mixture generated in the carburetor 40 is drawn into the pump cylinder 302 through the reed valve 330. During this suction stroke the power pistons 108 and 110 perform a compression stroke, wherein the scavenging ports 128A and 128B are closed by the power piston 108. Then, the pump pistons 308 and 310, after having passed their BDC, perform a compression stroke, whereby the mixture is compressed in the pump cylinder 302. When the power cylinder 110 has reached the exhaust port opening phase point Eo so that the exhaust ports are opened, the exhaust gases in the power cylinder 102 are exhausted through the exhaust ports, with the pressure of exhaust gases in the power cylinder being rapidly lowered. Then the first group of scavenging ports 128A are opened by the power piston 108. If at that time the engine is operating at such relatively high load that the delivery ratio is above 0.4, since the control valve 158 is opened, the scavenging mixture compressed by the pump 300 is supplied to the first group of scavenging ports 128A through the passage 153A and the first scavenging plenum 132A and is ejected into the power cylinder 102 with a relatively strong swirl given thereto. By contrast, if the engine is idling or is operating at a relatively low load with a delivery ratio smaller than 0.4, since the passage 153A is closed by the control valve 158, scavenging mixture is not yet supplied to the power cylinder even when the first group of scavenging ports 128A have been opened. When the power pistons further proceed toward their BDC, the second group of scavenging ports 128B are opened. When the engine is operating at a relatively high load with a delivery ratio at or above 0.4, upon the opening of the second group of scavenging ports 128B the flows of scavenging mixture ejected from the second group of scavenging ports with no swirling gather at a central portion of the lower cylinder and proceed along the central axis of the power cylinder towards its exhaust side in a manner of filling the central void of the helical flows of scavenging mixture generated by the scavenging mixture ejected from the first group of scavenging ports 128A and flowing towards the exhaust ports 130. When the engine is idling or is operating at a relatively low load with a delivery ratio below 0.4, only upon the opening of the second group of scavenging ports 128B is scavenging of the power cylinder initiated, wherein the flows of scavenging mixture ejected into the power cylinder from the second group of scavenging ports 128B with no swirling collide with each other at a central portion of the power cylinder and scavenging mixture gradually accumulates in the power cylinder in a stratified manner without generating any helical flow, and as the amount of scavenging mixture increases, the layer of scavenging mixture urges exhaust gases, particularly those existing at a radially central portion of the power cylinder, toward the exhaust ports along the central axis of the power cylinder while maintaining a stratified condition between the scavenging mixture and the exhaust gases without causing any great mixing therebetween. By this mutually adjacent existence of the layers of scavenging mixture and exhaust gases with no great mixing therebetween and by the formation of the layer scavenging mixture along the central axis of the power cylinder, fuel-air mixture forming the scavenging mixture is heated at a boundary region between the two layers by a hot mass of exhaust gases having high heat capacity without being cooled by the cylinder wall and is decomposed so as to generate chemically active radicals such as $C_2$, $CH$, $CHO$, $OOH$, $H$. When the engine is operating at a relatively low delivery ratio, such as below 0.4, the amount of exhaust gases which remains in the power cylinder and forms the abovementioned layer of exhaust gases is relatively large and has a relatively large heat capacity. Such a mass of exhaust gases can cause decomposition of the injected fuel-air mixture to an extent that is substantially effective for improving combustion of fuel in the engine. Furthermore, since in low load operation a substantial amount of exhaust gases remains in the power cylinder after the completion of the scavenging process, even in the subsequent compression stroke the decomposition of fuel-air mixture in the boundary region between the layers of scavenging mixture and exhaust gases continues. Therefore, when an engine is operated at a delivery ratio below 0.4 and at a rotational speed below 2000 rpm, the decomposition of fuel-air mixture proceeds so far that at the end of compression stroke the mixture nearly ignites by compression. By contrast, when the engine is operating at relatively high load with a delivery ratio being higher than 0.4, when the first group of scavenging ports 128A are opened, scavenging mixture is ejected into the power cylinder with a relatively great swirling so as to form a helical flow in the power cylinder, wherein no boundary surface between layers of scavenging mixture and exhaust gases effective for decomposition of fuel-air mixture is formed. However, in such high load operation the amount of scavenging mixture is too large relative to the heat capacity of the exhaust gases existing in the power cylinder to expect any substantial decomposition of scavenging mixture. In this case, therefore, it is more advantageous to give swirl to the scavenging mixture so as to expedite generation of turbulence in the scavenging mixture so that the combustion speed of the scavenging mixture increases.

In either case, after the second group of scavenging ports 128B or the first and second groups of scavenging ports 128A and 128B have been closed, the scavenging mixture is compressed in the power cylinder 102, and at a phase point slightly before power piston TDC the mixture is ignited by the spark plug 156, and then the engine proceeds to the combustion and expansion stroke, and at the end of the expansion stroke the exhaust ports 130 are again opened. By the repetition of these strokes the engine generates rotary power.

Figure 7:
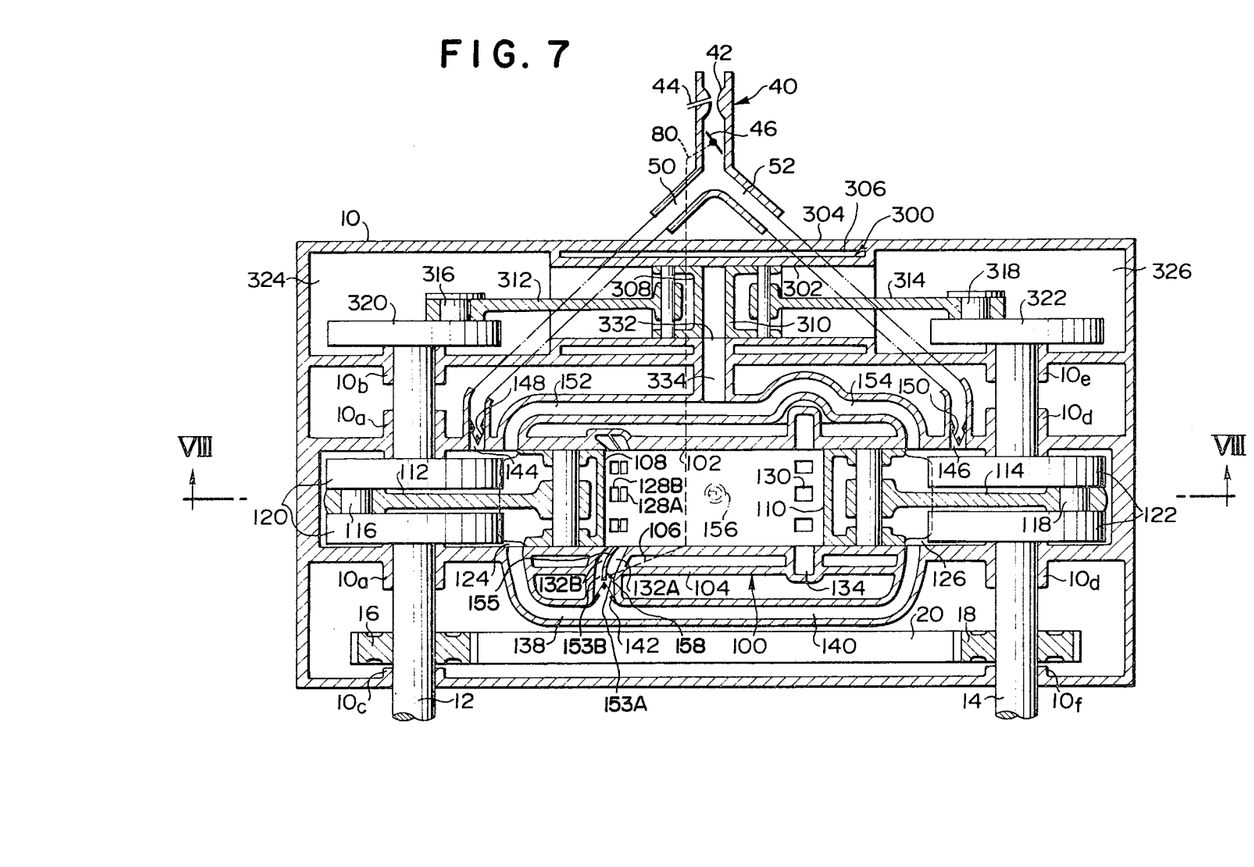
FIG. 7 is a diagrammatical plan sectional view similar to FIG. 1 showing a second embodiment of the two-stroke cycle gasoline engine of the present invention.
Figure 8:
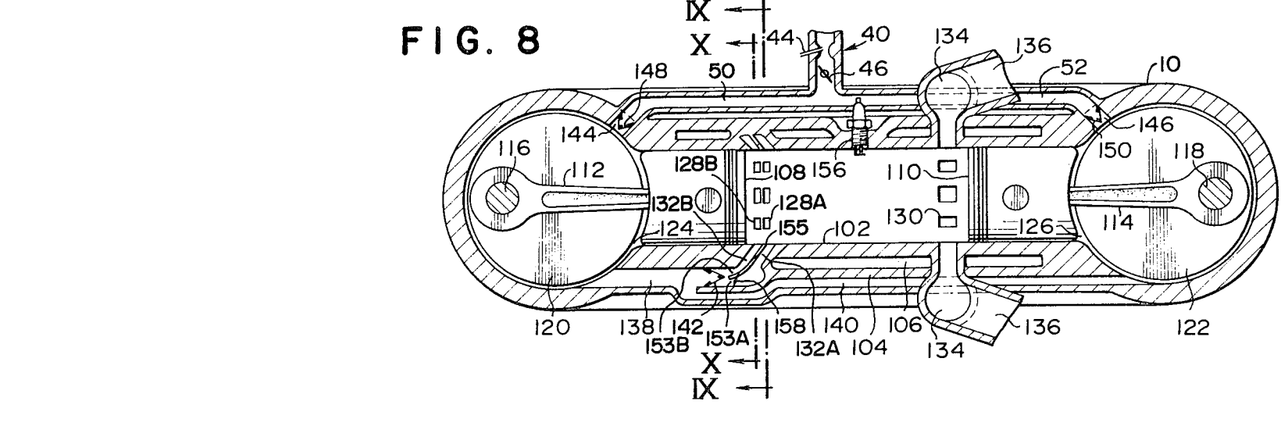
FIG. 8 is a sectional view along line VIII—VIII in FIG. 7.
Figure 9:
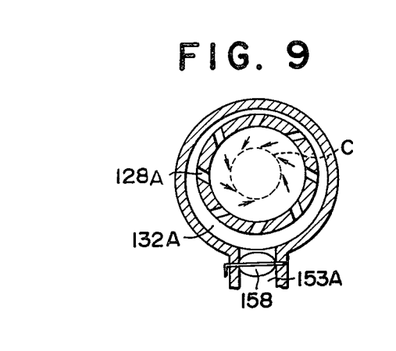
FIGS. 9 and 10 are sectional views along lines IX—IX and X—X in FIG. 8, respectively.
Figure 10:
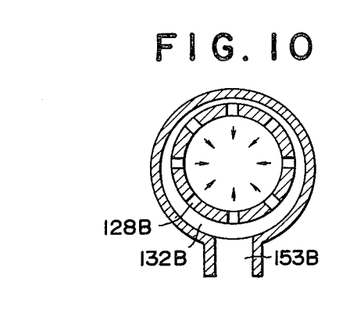

FIG. 7 is a diagrammatical plan sectional view showing a second embodiment of the two-stroke cycle gasoline engine of the present invention; FIG. 8 is a sectional view along line VIII—VIII in FIG. 7; and FIGS. 9 and 10 are sectional views along lines IX—IX and X—X in FIG. 8. In these figures the portions corresponding to those shown in FIGS. 1-4 are designated by the same reference numerals as in FIGS. 1-4. This second embodiment employs crankcase compression in addition to a supplementary scavenging pump for compressing scavenging mixture. In this embodiment the crank arms 120 and 122 of the power assembly 100 are disk-shaped, and crank assemblies each being composed of a pair of these crank arms and a crank pin connecting the pair of crank arms are received in the crankcases 124 and 126, respectively, so that a substantial part of the space in each crankcase is occupied by the crank assembly regardless of the rotational angle of the crank arms so as to minimize the clearance volume of the crankcase and to increase the effectiveness of the crankcase compression. In this embodiment the outlet of the carburetor 40 is connected with the crankcases 124 and 126 of the power assembly 100 by way of passages 50 and 52 so that the mixture generated by the carburetor 40 is directly supplied to the crankcases 124 and 126. In ports 144 and 146 at which the passages 50 and 52 open to the crankcases 124 and 126, respectively, are provided reed valves 148 and 150, respectively, so as to prevent reverse flowing of scavenging mixture. The crankcases 124 and 126 are connected with an outlet port 332 of the supplementary scavenging pump 300 by way of passages 152 and 154, respectively, and a common passage 334 on the one hand, while on the other hand the crankcases 124 and 126 are connected with the first and second scavenging plenums 132A and 132B by way of passages 138 and 140, respectively. In this case, in a portion in which the passages 138 and 140 are joined with each other so as to be connected with the first and second scavenging plenums 132A and 132B is provided a partition 155 which defines passage portions 153A and 153B separated from each other and individually connected to the scavenging plenums 132A and 132B. In the passage portion 153A is provided a control valve 158 which selectively closes the passage portion 153A. The control valve 158 is controlled by a control system 80 to be opened or closed in accordance with the opening of the throttle valve 46, in the same manner as in the first embodiment shown in FIGS. 1-5.

Also in this embodiment, as shown in FIG. 9, the first group of scavenging ports 128A open along axes tangential to a phantom cylinder C coaxial with the cylinder 102 so as to impart a relatively strong swirl to the mixture ejected from the scavenging ports. On the other hand, as shown in FIG. 10, the second group of scavenging ports 128B open toward the central axis of the power cylinder so as not to impart any swirl to the mixture ejected from them. Furthermore, all these scavenging ports are inclined towards the exhaust side of the cylinder, so that the flows of scavenging mixture discharged from these scavenging ports have a velocity component towards the exhaust ports 130.

In this second embodiment which employs crankcases and a supplementary scavenging pump for the compression of scavenging mixture, in the suction stroke the crankcase 124 and 126 take in mixture through the passages 50 and 52 and a carburetor 40, while the pump 300 which operates substantially in the same phase as the crankcase 124 and 126 takes in mixture from the crankcases 124 and 126 through the passages 152, 154, and 334, and therefore, as a whole, further through the passages 50 and 52 and the carburetor 40. When the crankcases 124 and 126 and the pump 300 begin to perform their compression strokes, the mixture in the crankcase 124 and 126 is compressed in these crankcases while remaining therein, while on the other hand the mixture drawn into the pump cylinder 302 is again pushed back to the crankcase 124 and 126 through the passages 334, 152, and 154 as it is compressed between the pump pistons 308 and 310. The mixture thus compressed in either of the two crankcases or in both the pump cylinder and either of the two crankcases is supplied towards the first and second scavenging plenums 132A and 132B through the passage 138 or 140. Also in this embodiment, when the engine is operating at relatively high load with a delivery ratio at or higher than 0.4, scavenging mixture is ejected from both the first and second scavenging ports 128A and 128B so as to generate relatively strong turbulence in the mixture supplied in the power cylinder, while on the other hand when the engine is operating at relatively low load with a delivery ratio lower than 0.4 the first group of scavenging ports 128A are closed so that scavenging mixture is ejected only from the second group of scavenging ports 128B without being imparted with any swirling, in the same manner as described with reference to the first embodiment.

If it is desired that the present invention should be embodied in a two-stroke cycle gasoline engine which employs only its crankcases for the compression of scavenging mixture, it will be apparent that the pump 300 and the associated structures such as passages 334, 152, and 154 need only be deleted. Furthermore, although in the first and second embodiments the pump 300 is constructed to incorporate two horizontally opposed pistons, the pump may be constructed as a single piston pump. In that case, it will be apparent that either one of the pump pistons 308 and 310 and its associated structure, and also its associated passage 152 or 154, in the case of the second embodiment, need only be deleted.

Furthermore, although one power cylinder-piston assembly 100 and one pump cylinder-piston assembly 300 are incorporated in an engine in the above-described embodiment, if an engine having a high power output is to be constructed, more than one power cylinder-piston assembly may be incorporated in an engine, and in this connection more than one pump cylinder-piston assembly or a pump of a double acting type may be incorporated in an engine. These various modifications are shown in a similar manner in the specifications and the drawings of the aforementioned U.S. Pat. No. 4,185,596 and copending U.S. patent application Ser. No. 917,244, which should be referred to, if required.

Although the invention has been shown and described with respect to some preferred embodiments thereof, it should be understood by those skilled in the art that various changes and omissions of the form and detail thereof may be made therein without departing from the scope of the invention.

We claim:
1. A two-stroke cycle gasoline engine, comprising:
 (a) at least one two-stroke cycle power cylinder-piston assembly, including:
  (1) a power cylinder;
  (2) first scavenging port means in fluid communication with said power cylinder proximate one axial end thereof for generating a substantially uniform, cylindrical, strongly swirling flow of scavenging mixture in said power cylinder;
  (3) second scavenging port means in fluid communication with said power cylinder proximate said one axial end thereof for generating a substantially uniform flow of scavenging mixture in said power cylinder, said flow being up to a weak swirling flow having substantially less strength than the swirling flow of said first scavenging port means;
  (4) first and second passages in fluid communication with said first and second scavenging port means, respectively;
  (5) exhaust ports in fluid communication with said power cylinder proximate the other axial end thereof; and
  (6) two horizontally opposed pistons disposed in said power cylinder for reciprocal motion, one of said pistons opening and closing said first and second scavenging port means and the other of said pistons opening and closing said exhaust ports;
 (b) a scavenging pump device in fluid communication with said first and second passages for supplying scavenging mixture thereto; and
 (c) control valve means incorporated in said first passage for closing said first passage when delivery ratio of said engine is below a predetermined value determined by intermediate positions of an intake throttle valve causing scavenging of said power cylinder by the scavenging mixture flow generated by said second scavenging port means to effect layered contact between said scavenging flow and exhaust gases existing in said power cylinder, and for opening said first passage when the delivery ratio of said engine is at as well as above said predetermined value causing scavenging of said power cylinder by the combination of scavenging mixture flow generated by said first and second scavenging port means forming a radially internal core portion of said combined scavenging flow.

2. The engine of claim 1, wherein said predetermined value is approximately 0.4.

3. The engine of either of claim 1 or 2 wherein said first scavenging port means is a first group of scavenging ports, said first group of scavenging ports being inclined, as seen in a plane perpendicular to the longitudinal axis of the bore of said power cylinder, at a relatively large angle to the radii of the bore of said power cylinder, and wherein said second scavenging port means is a second group of scavenging ports, said second group of scavenging ports being aligned along the radii of the bore of said power cylinder.

4. The engine of claim 3, wherein said first group of scavenging ports are arranged so as to be opened in advance of said second group of scavenging ports.

5. The engine of claim 3, further comprising a linkage which connects said intake throttle valve and said control valve so that the opening of said control valve is controlled in accordance with the opening of said intake throttle valve.

6. The engine of claim 5, wherein said linkage comprises an electric circuit including a battery, a solenoid which operates said control valve so as to open said control valve when energized, and an electric contact means which includes a stationary contact element and a movable contact element which is operationally connected with said intake throttle valve, said stationary and movable contacts being adapted to contact with each other so as to complete said electric circuit when said intake throttle valve is opened beyond a predetermined opening.

* * * * *